(12) United States Patent
Kato

(10) Patent No.: US 9,563,297 B2
(45) Date of Patent: Feb. 7, 2017

(54) DISPLAY DEVICE AND OPERATING METHOD THEREOF

(71) Applicant: NEC CASIO Mobile, Communications, Ltd., Kanagawa (JP)

(72) Inventor: Hiromu Kato, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 14/382,405

(22) PCT Filed: Jan. 24, 2013

(86) PCT No.: PCT/JP2013/051412
§ 371 (c)(1),
(2) Date: Sep. 2, 2014

(87) PCT Pub. No.: WO2013/128989
PCT Pub. Date: Sep. 6, 2013

(65) Prior Publication Data
US 2015/0103017 A1   Apr. 16, 2015

(30) Foreign Application Priority Data

Mar. 2, 2012   (JP) .................................. 2012-047144

(51) Int. Cl.
*G09G 5/00*   (2006.01)
*G06F 3/041*   (2006.01)
(Continued)

(52) U.S. Cl.
CPC .............. *G06F 3/041* (2013.01); *G06F 3/016* (2013.01); *G06F 3/03547* (2013.01);
(Continued)

(58) Field of Classification Search
CPC ...... G06F 3/016; G06F 3/03547; G06F 3/041; G06F 3/0481; G06F 3/0488; G06F 3/04883; G06F 2203/04108; G06F 2203/04806
See application file for complete search history.

(56) References Cited

U.S. PATENT DOCUMENTS

| 7,593,000 B1 | 9/2009 | Chin | |
|---|---|---|---|
| 2009/0102805 A1* | 4/2009 | Meijer | G06F 3/016 345/173 |

(Continued)

FOREIGN PATENT DOCUMENTS

| JP | 2009-217816 | 9/2009 |
|---|---|---|
| JP | 2010-147973 | 7/2010 |

(Continued)

OTHER PUBLICATIONS

Extended European search report, dated Sep. 30, 2015; Application No. 13754946.5.

(Continued)

*Primary Examiner* — Kent Chang
(74) *Attorney, Agent, or Firm* — Young & Thompson

(57) ABSTRACT

A display device includes: a display unit (20) that displays information; a touch panel unit (10) that is disposed on the display unit (20) and that detects contact manipulations; a tactile sensation presentation unit (60) that presents tactile sensations via the touch panel unit (10); an input assessment unit (70) that, on the basis of the conditions that have been set with respect to contact manipulations, determines the display of the display unit (20) and the operation of the tactile sensation presentation unit (60) in accordance with the contact manipulation that was detected on the touch panel (10); and a CPU (90) that, on the basis of the determination in the input assessment unit (70), controls the display of the display unit (20) and the operation of the tactile sensation presentation unit (60).

1 Claim, 5 Drawing Sheets

| Manipulation | Tactile Sensation Presentation Control | Display Control |
|---|---|---|
| Start of tracing within 0.5 seconds of touching | No presentation of tactile sensation | Scrolling or flicking |
| Start of tracing after the passage of 0.5 seconds of touching | Present tactile sensation | No scrolling |
| Removal within 0.3 seconds of touching | No presentation of tactile sensation | Temporary halt of moving picture |
| Pinch-in/Pinch-out | No presentation of tactile sensation | Reduction/Enlargement |
| Touching for 1 second or more | Intensify presented tactile sensation | Enlarge |

(51) Int. Cl.
*G06F 3/01* (2006.01)
*G06F 3/0488* (2013.01)
*G06F 3/0481* (2013.01)
*G06F 3/0354* (2013.01)

(52) U.S. Cl.
CPC .......... *G06F 3/0481* (2013.01); *G06F 3/0488* (2013.01); *G06F 3/04883* (2013.01); *G06F 2203/04108* (2013.01); *G06F 2203/04806* (2013.01)

(56) References Cited

U.S. PATENT DOCUMENTS

| | | | |
|---|---|---|---|
| 2009/0227295 A1 | 9/2009 | Kim | |
| 2009/0227296 A1 | 9/2009 | Kim | |
| 2011/0210834 A1 | 9/2011 | Pasquero et al. | |
| 2011/0248837 A1* | 10/2011 | Israr | G06F 3/016 340/407.1 |
| 2011/0264491 A1* | 10/2011 | Birnbaum | G06F 3/016 705/14.4 |
| 2011/0273380 A1 | 11/2011 | Martin | |

FOREIGN PATENT DOCUMENTS

| | | |
|---|---|---|
| JP | 2010-250750 | 11/2010 |
| JP | 2011-501298 | 1/2011 |
| JP | 2011-054025 | 3/2011 |

OTHER PUBLICATIONS le;4qKaaresoja et al: "Snap-Crackle-Pop: Tactile Feedback for Mobile Touch Screens", Proceedings of Eurohaptics vol. 2006, Jul. 3, 2006, pp. 565-566, XP055110422.

Immersion, "Enhancing Your Device Design Through Tactile Feedback", Jun. 11, 2011, XP055211739, Retrieved from the Internet: URL:https://web.archive.org/web/2011,0611040554/http://immersion.com/docs/Enhancing-Device-Design-Through-TactileFeedback.pdf.

International Search Report, PCT/JP2013/051412, Feb. 26, 2013.

* cited by examiner

Fig.3

| Manipulation | Tactile Sensation Presentation Control | Display Control |
|---|---|---|
| Start of tracing within 0.5 seconds of touching | No presentation of tactile sensation | Scrolling or flicking |
| Start of tracing after the passage of 0.5 seconds of touching | Present tactile sensation | No scrolling |
| Removal within 0.3 seconds of touching | No presentation of tactile sensation | Temporary halt of moving picture |
| Pinch-in/Pinch-out | No presentation of tactile sensation | Reduction/Enlargement |
| Touching for 1 second or more | Intensify presented tactile sensation | Enlarge |

DISPLAY DEVICE AND OPERATING METHOD THEREOF

TECHNICAL FIELD

The present invention relates to a display device and an operating method of the display device, and more particularly relates to a display device that is operated by using a touch panel and to an operating method of the display device.

BACKGROUND ART

In recent years, starting from smartphones, display devices that are operated by using a touch panel have come into widespread use. In such display devices, a touch panel is disposed over the display, and touching an area in which, for example, a button is displayed on the display causes an operation to be carried out according to the button.

In display devices that are operated by using this type of touch panel, devices have been considered that, by imparting a vibration or an electrical stimulus to the skin when the touch panel is touched, provide a tactile sensation in accordance with information such as an image that is displayed in that area (for example, see Patent Document 1 or Patent Document 2).

LITERATURE OF THE PRIOR ART

Patent Documents

Patent Document 1: Japanese Unexamined Patent Application Publication No. 2010-250750
Patent Document 2: Japanese Unexamined Patent Application Publication (Translation of PCT Application) No. 2011-501298

SUMMARY OF THE INVENTION

Problem to be Solved by the Invention

With the popularization of the above-described display devices, manipulation of the touch panels has become more varied. Rather than merely selecting and designating information that is shown on the display, users may trace a screen to display scrolling of information, perform a flicking operation to transition to the next item or to flip through pages, or perform a pinch-in or pinch-out manipulation to reduce or enlarge the display of information. When performing such manipulations, however, there is no need for presenting a tactile sensation in accordance with information such as an image that is displayed in the area that is touched. Conversely, there are cases in which, when performing manipulation such as tracing the screen, it is requested just to present a tactile sensation without showing the scrolling of information.

However, in a display device that presents a tactile sensation such as described above, there are cases in which, because controlling the presentation of a tactile sensation and the display are of a general nature and determined in advance depending on the track of the movement of fingers that contact the touch panel, operations may be carried out that differ from the operation actually desired by the user.

The present invention was realized in view of the above-described problem and has as an object the provision of a display device and operating method of the display device that, in a display device that performs operations in accordance with contact manipulation and tactile sensation presentation due to contact, can perform operations that correspond to each of a variety of manipulations performed by the user.

Means for Solving the Problem

The present invention for achieving the above-described object includes:
display means that displays information;
contact/proximity detection means that is provided on the display means and that detects a contact and/or proximate manipulation;
tactile sensation presentation means that presents a tactile sensation by way of the contact/proximity detection means;
input assessment means that, based on conditions that have been set for the contact and/or proximate manipulations, determines display of the display means and operation of the tactile sensation presentation means in accordance with contact and/or proximate manipulation that was detected in the contact/proximity detection means; and
control means that, based on the determination in the input assessment means, controls display of the display means and operation of the tactile sensation presentation means.

The operating method is an operating method of a display device that includes display means that displays information, contact/proximity detection means that is provided on the display means and that detects contact and/or proximate manipulations, and tactile sensation presentation means that presents tactile sensation by way of the contact/proximity detection means; the operating method including:
based on conditions that have been set regarding the contact and/or proximate manipulation, controlling display of the display means and operation of the tactile sensation presentation means in accordance with the contact and/or proximate operation that was detected in the contact/proximity detection means.

The program of the present invention is a program for causing a display device that has display means that displays information, contact/proximity detection means that is provided on the display means and that detects contact and/or proximate manipulation, and tactile sensation presentation means that presents tactile sensation by way of the contact/proximity detection means to execute procedures of:
based on conditions that have been set for the contact and/or proximate manipulation, determining display of the display means and operation of the tactile sensation presentation means that accord with contact and/or proximate manipulation that was detected in the contact/proximity detection means; and
based on the determination, controlling display of the display means and operation of the tactile sensation presentation means.

Effect of the Invention

According to the present invention, a configuration is adopted that, based on conditions that have been set for contact and/or proximate manipulation, controls the display of display means and operation of the tactile sensation presentation means that accord with contact and/or proximate manipulation that has been detected, whereby operation can be carried out that corresponds to each of a variety of manipulations performed by the user.

BRIEF DESCRIPTION OF THE DRAWINGS

FIG. 3 shows an example of a table belonging to the input assessment unit shown in FIG. 2.

BEST MODE FOR CARRYING OUT THE INVENTION

An exemplary embodiment of the present invention is next described with reference to the accompanying drawings.

Figure 1:
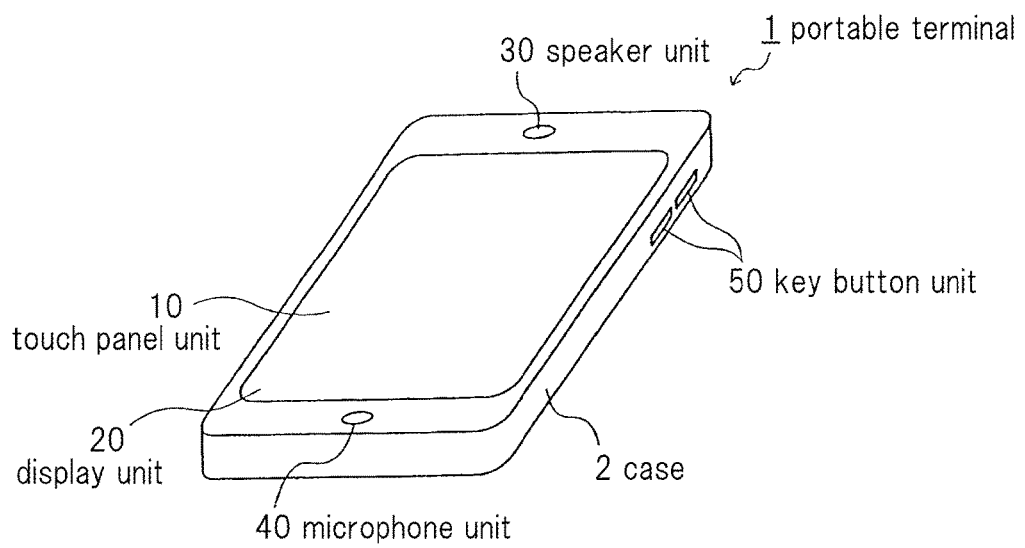
FIG. 1 is an outer perspective view showing an exemplary embodiment of the display device of the present invention.
Figure 2:
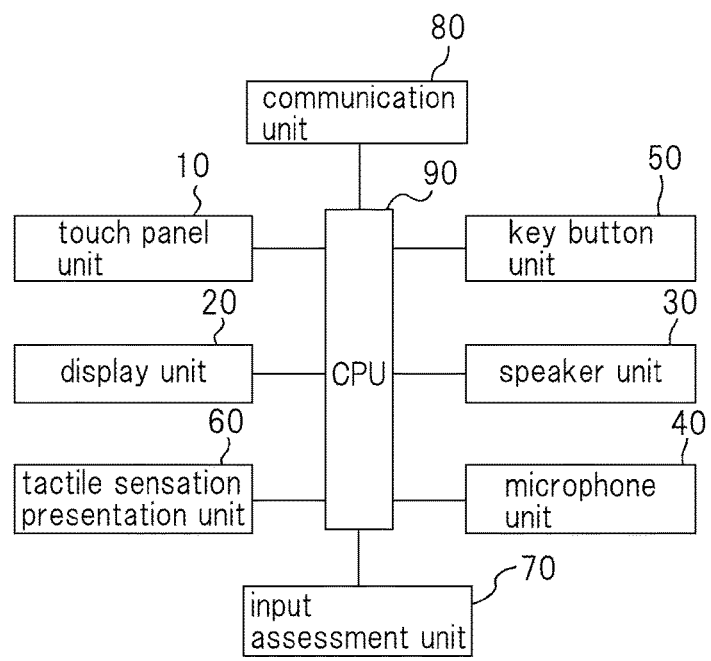
FIG. 2 is a block diagram showing an example of the internal configuration of the portable terminal shown in FIG. 1.

FIG. 1 is an outer perspective view showing an exemplary embodiment of the display device of the present invention. FIG. 2 is a block diagram showing an example of the internal configuration of portable terminal 1 shown in FIG. 1.

As shown in FIG. 1 and FIG. 2, the present exemplary embodiment is portable terminal 1 provided with touch panel unit 10 that serves as the contact/proximity detection means, display unit 20 that serves as the display means, speaker unit 30, and microphone unit 40 on one surface of flat case 2, and provided with key button unit 50 on the side surface of case 2.

Display unit 20 is made up of, for example, liquid crystal and displays information such as images under the control of CPU 90, which is the control means.

Touch panel unit 10 is provided over display unit 20, and when a contact manipulation is performed by a contacting body such as a finger, detects the contact manipulation. Examples of touch panel unit 10 include components that use resistance film or that use electrostatic capacitance.

Speaker unit 30, under the control of CPU 90, supplies as output voice that was received by way of communication unit 80 or voice that was stored in the memory (not shown) of CPU 90.

Microphone unit 40 is a component into which voice is applied as input.

Key button unit 50 is a component into which information is applied as input for manipulating portable terminal 1.

Communication unit 80 transmits and receives information by way of a portable terminal network.

Tactile sensation presentation unit 60 is made up of, for example, a compact vibrator, and by causing vibration of touch panel unit 10, presents by way of touch panel unit 10 a tactile sensation in accordance with an image displayed on display unit 20 to a contacting body such as a finger that is in contact with touch panel unit 10.

Input assessment unit 70 has a table (not shown) for determining the display of display unit 20 and the operation of tactile sensation presentation unit 60 in accordance with contact manipulation to touch panel unit 10. Input assessment unit 70 refers to this table to determine the display of display unit 20 and operation of tactile sensation presentation unit 60 in accordance with the contact manipulation to touch panel unit 10.

FIG. 3 shows an example of the table belonging to input assessment unit 70 shown in FIG. 2.

As shown in FIG. 3, the table belonging to input assessment unit 70 shown in FIG. 2 places in correspondence display of display unit 20 as well as operation carried out by tactile sensation presentation unit 60 for each of contact manipulations that are carried out with respect to touch panel unit 10. In other words, the conditions of contact manipulation of touch panel unit 10 are set in this table regarding the display of display unit 20 and the operation of tactile sensation presentation unit 60. For example, when a tracing manipulation of touch panel unit 10 is detected within 0.5 seconds of detecting a contact manipulation of touch panel unit 10, an operation is set which display unit 20 carries out such as page-turning by scrolling a display or flicking, and while in tactile sensation presentation unit 60, an operation is set in which a tactile sensation is not presented and no action is taken. Whether scrolling a display or page-turning by flicking is to be adopted in display unit 20 is set according to the speed of movement realized by the tracing manipulation of touch panel unit 10. Operation is further set by which, when a manipulation of tracing touch panel unit 10 is detected after the passage of 0.5 seconds from the detection of a contact manipulation on touch panel unit 10, tactile sensation presentation unit 60 operates to present a tactile sensation without any change of the display on display unit 20. In addition, operation is set by which, when a contact manipulation is not detected within 0.3 second of detecting contact manipulation on touch panel unit 10 in a state in which a moving picture is being reproduced on display unit 20, the moving picture being displayed on display unit 20 is temporarily halted and, in tactile sensation presentation unit 60, tactile sensation is not presented and no action is taken. Still further, operation is set by which, when a pinch-in/pinch-out contact manipulation is detected in touch panel unit 10, the image displayed on display unit 20 is subjected to reduced/enlarged display, and further, no tactile sensation is presented and no action is taken in tactile sensation presentation unit 60. Still further, a setting is made indicating that when contact to one area of touch panel unit 10 that continues one second or longer is detected in touch panel unit 10, not only is the image that is being displayed on display unit 20 subjected to enlarged display, but the tactile sensation presented in tactile sensation presentation unit 60 is intensified.

Based on the conditions that have been set in the above-described table, input assessment unit 70 determines the display of display unit 20 and the operation of tactile sensation presentation unit 60 in accordance with the contact manipulation that was detected in touch panel unit 10.

CPU 90 is a component that incorporates memory (not shown) and that controls all of portable terminal 1, and based on the determination in input assessment unit 70, CPU 90 controls the display of display unit 20 and the operation of tactile sensation presentation unit 60.

Explanation next regards the operating method of portable terminal 1 that is configured as described hereinabove, taking as an example an operating method based on the table shown in FIG. 3.

Figure 4:
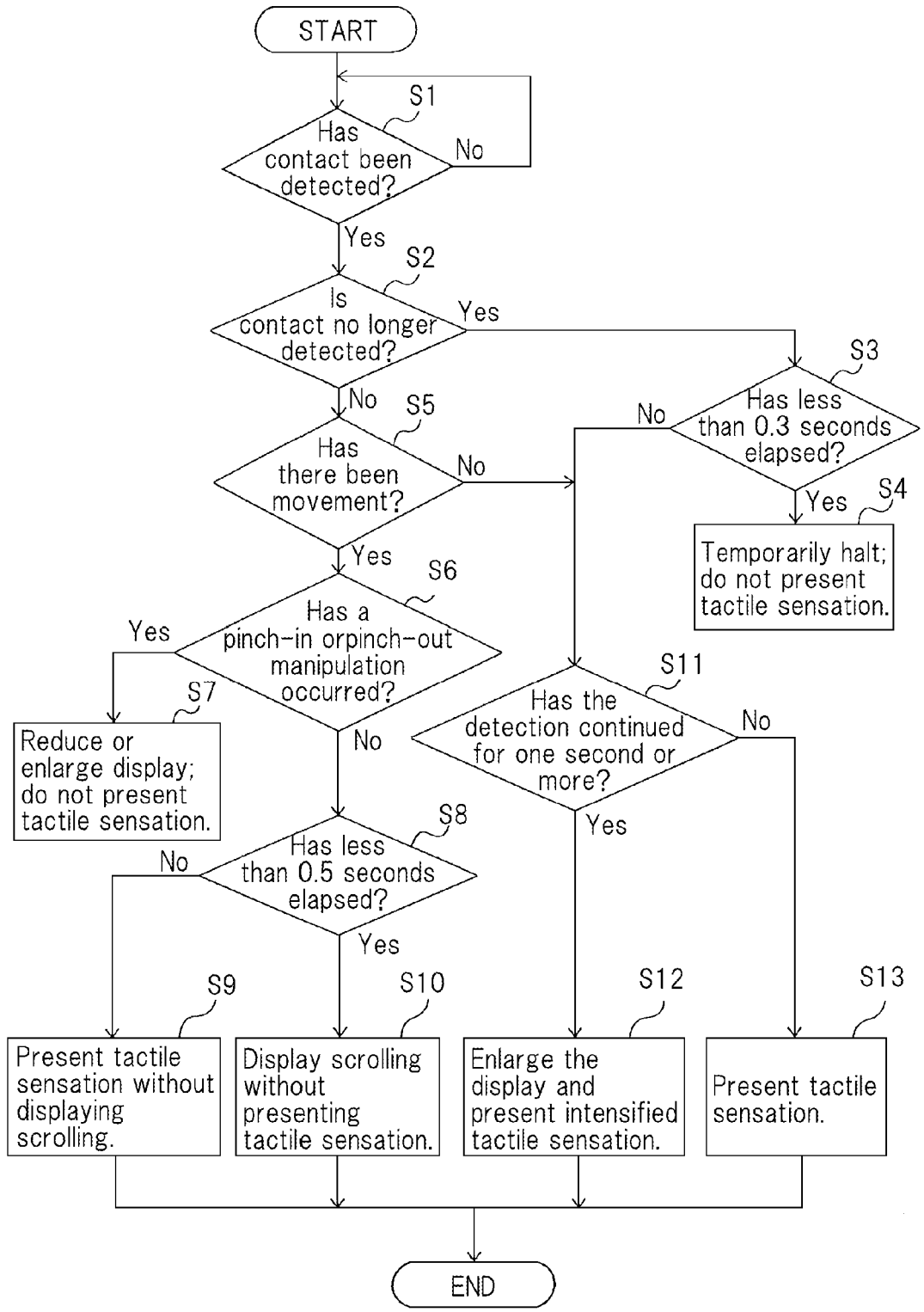
FIG. 4 is a flow chart for describing the operating method that is based on the table shown in FIG. 3 in the portable terminal shown in FIG. 1 and FIG. 2.

FIG. 4 is a flow chart for describing the operating method that is based on the table shown in FIG. 3 in portable terminal 1 shown in FIG. 1 and FIG. 2.

When a user places a finger in contact with the touch panel unit 10 and contact manipulation is detected in touch panel unit 10 in a state in which an image is being displayed on display unit 20 of portable terminal 1 (Step 1), controlling the operation of portable terminal 1 in accordance with the contact manipulation is started in CPU 90.

When contact manipulation is no longer detected within 0.3 seconds from detection of contact manipulation on touch panel unit 10 due to the user removing his or her finger from touch panel unit 10 within 0.3 seconds following detection of contact manipulation on touch panel unit 10 (Steps 2 and 3), operations are determined in input assessment unit 70 based on the conditions that have been set in the table shown in FIG. 3 both to temporarily halt the moving picture that is being displayed on display unit 20 and to not present a tactile sensation in tactile sensation presentation unit 60. This determination is then sent to CPU 90, and if a moving picture is being displayed on display unit 20, the moving picture is temporarily halted under the control of CPU 90 (Step 4). Here, if tactile sensation presentation unit 60 is not operating, there is no need to implement control to halt operation of tactile sensation presentation unit 60, but if tactile sensation presentation unit 60 is operating, the operation of tactile sensation presentation unit 60 is temporarily halted under the control of CPU 90.

Alternatively, when is a state in which contact manipulation has been detected in touch panel unit 10 and the user moves his/her finger that is in contact with touch panel unit 10 and when the area in which the contact manipulation is detected on touch panel unit 10 moves (Step 5), it is determined in input assessment unit 70 whether this contact manipulation is a pinch-in or pinch-out manipulation (Step 6). The determination of whether the contact manipulation is a pinch-in or pinch-out manipulation can be realized by using techniques typically carried out in a display device having touch panel unit 10, such as by determining a pinch-in or pinch-out when the number of contacts that are detected on touch panel unit 10 is two and the positions of these two points are moving in a direction toward each other or in a direction away from each other.

In input assessment unit 70, when it is determined that the contact manipulation with respect to touch panel unit 10 is a pinch-in manipulation, operations are determined based on the conditions that have been set in the table shown in FIG. 3 to subject the areas of the image being displayed on display unit 20, in which the pinch-in manipulation is being performed, to reduced display and to not present tactile sensation in tactile sensation presentation unit 60. This determination is then sent to CPU 90, and under the control of CPU 90, the image of the area in which the pinch-in manipulation was performed of the image that is being displayed on display unit 20 is subjected to reduced display without operating tactile sensation presentation unit 60. Alternatively, when it is determined in input assessment unit 70 that the contact manipulation with respect to touch panel unit 10 is a pinch-out manipulation, operations are determined to both subject the image of the area being displayed on display unit 20 in which the pinch-out manipulation was performed to enlarged display and to not present tactile sensation in tactile sensation presentation unit 60. This determination is then sent to CPU 90, and under the control of CPU 90, the image of the area in which the pinch-out manipulation was performed of the image that is being displayed on display unit 20 is subjected to enlarged display without operating tactile sensation presentation unit 60 (Step 7).

When it is determined that the contact manipulation with respect to touch panel unit 10 is not a pinch-in or a pinch-out manipulation, it is determined in input assessment unit 70 whether the time interval from the detection of contact manipulation on touch panel unit 10 until movement of the area in which contact manipulation was detected on touch panel unit 10 is within 0.5 seconds (Step 8).

If the time interval from the detection of contact manipulation on touch panel unit 10 until the movement of the area in which contact manipulation was detected on touch panel unit 10 is greater than 0.5 seconds, an operation is determined in input assessment unit 70 based on the conditions that have been set in the table shown in FIG. 3 to present a tactile sensation in tactile sensation presentation unit 60 without altering the image that is displayed on display unit 20 such as by a scrolling display. This determination is then sent to CPU 90, and under the control of CPU 90, tactile sensation presentation unit 60 operates to present a tactile sensation to the finger that is in contact with touch panel unit 10 without altering the display of display unit 20 (Step 9). Tactile sensation presentation unit 60 is made up of, for example, a compact vibrator as described hereinabove, and the operation of tactile sensation presentation unit 60 that according to the area in which a contact manipulation is detected in touch panel unit 10 is set in advance in CPU 90. For example, when tactile sensation presentation unit 60 is made up of a compact vibrator, the intensity of the vibration of the vibrator is set according to the area in which contact manipulation was detected on touch panel unit 10. Then, by controlling the vibrator to vibrate at this intensity in CPU 90, the user can be caused to feel just as if he or she is touching an object through the image that is displayed in the area of contact.

When the time interval from the detection of a contact manipulation on touch panel unit 10 until movement of the area in which the contact manipulation was detected is within 0.5 seconds, operations are determined in input assessment unit 70 based on the conditions that have been set in the table shown in FIG. 3 to both subject the image that is displayed on display unit 20 to scrolled display in the direction of movement of the area in which the contact manipulation was detected on touch panel unit 10 and to not present tactile sensation in tactile sensation presentation unit 60. This determination is then sent to CPU 90, and under the control of CPU 90, the image that is displayed on display unit 20 is displayed scrolling in the direction of movement of the area in which the contact manipulation was detected on touch panel unit 10 without operating tactile sensation presentation unit 60 (Step 10). When a flicking manipulation is judged to have been performed in input assessment unit 70 due to the speed of the movement of the contact manipulation that was detected, a transition to the next item or turning of the page may be carried out instead of the above-described scrolling display. Even when displaying scrolling, a tactile sensation may be presented. In such cases, these indications are set in input assessment unit 70.

Details of the operations in the above-described Steps 9 and 10 are next described.

Figure 5A:
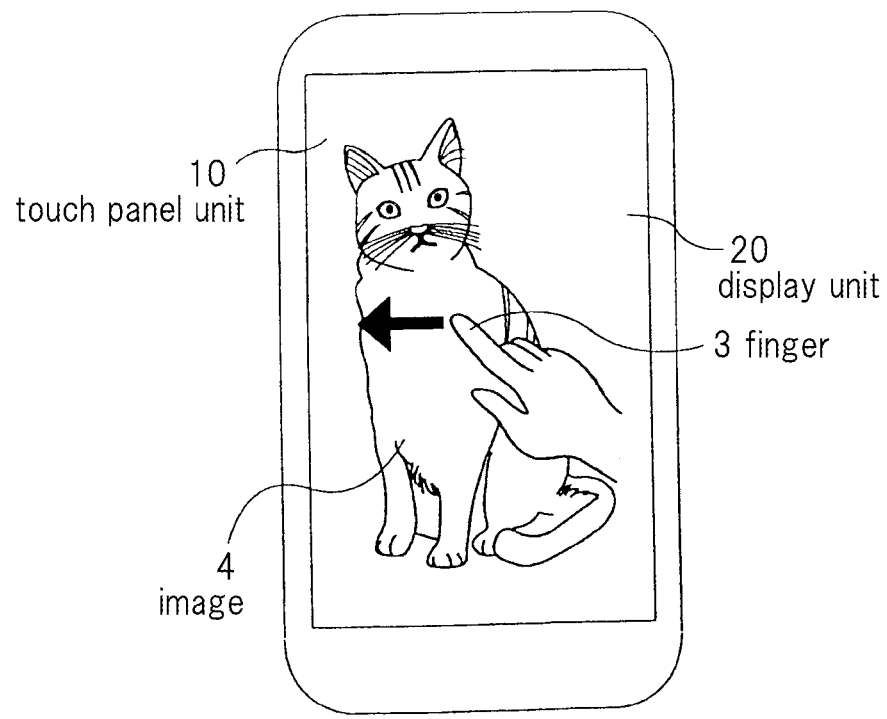
FIG. 5a is a view for describing an example of the operation of the portable terminal shown in FIG. 1 and FIG. 2.
Figure 5B:
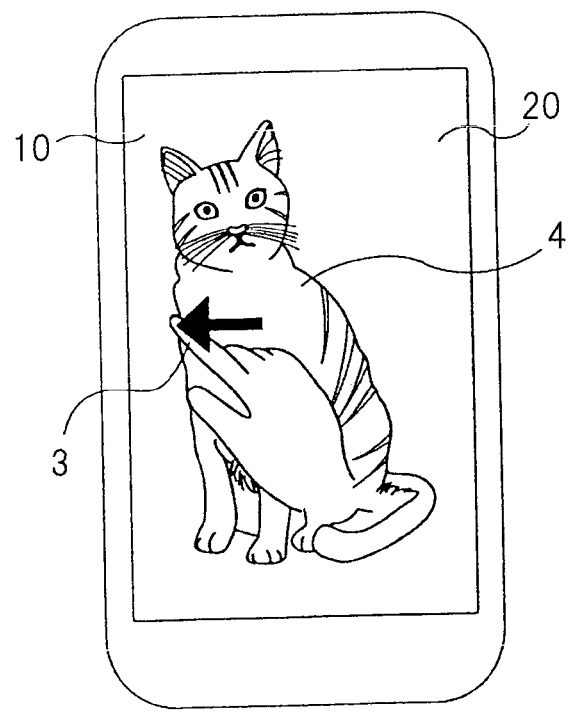
FIG. 5b is a view for describing an example of the operation of the portable terminal shown in FIG. 1 and FIG. 2.
Figure 5C:
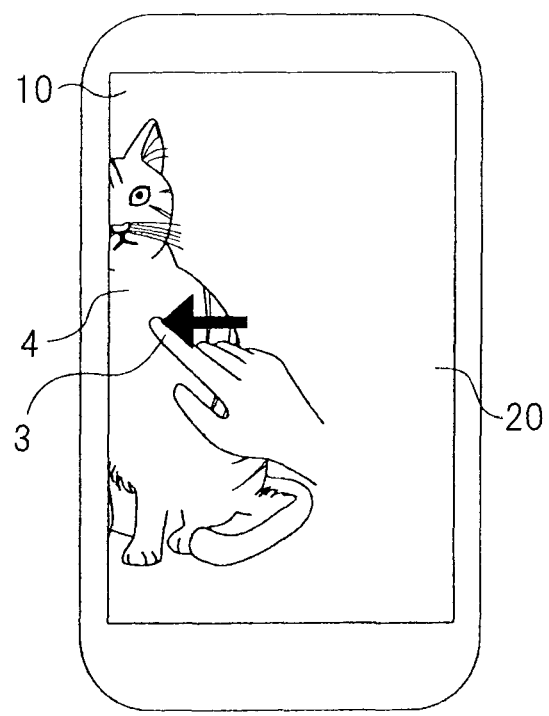
FIG. 5c is a view for describing an example of the operation of the portable terminal shown in FIG. 1 and FIG. 2.

FIGS. 5*a*-5*c* are views for describing an example of the operation of portable terminal 1 shown in FIG. 1 and FIG. 2.

As shown in FIG. 5*a*, in a state in which image 4 is displayed on display unit 20, when finger 3 contacts the area of touch panel unit 10 in which image 4 is displayed, the contact manipulation with respect to image 4 is detected in touch panel unit 10. Then, when the surface of touch panel unit 10 is traced by finger 3 that is contacting touch panel unit 10, it is judged in input assessment unit 70 whether the time interval from the detection of the contact manipulation on touch panel unit 10 until the surface of touch panel unit 10 is traced and the area in which the contact manipulation is detected moves is within 0.5 seconds.

If the time interval from the detection of the contact manipulation on touch panel unit 10 until movement of the area in which the contact manipulation on touch panel unit 10 was detected exceeds 0.5 seconds, a tactile sensation in accordance with image 4 is presented by tactile sensation presentation unit 60 to finger 3 by way of touch panel unit 10 without displaying scrolling of image 4 that is displayed on display unit 20, as shown in FIG. 5*b*.

If the time interval from the detection of the contact manipulation on touch panel unit 10 until movement of the area in which the contact manipulation was detected on touch panel unit 10 is within 0.5 seconds, image 4 that is displayed on display unit 20 will be displayed scrolling in the direction of movement of the area in which the contact manipulation was detected on touch panel unit 10 as shown in FIG. 5*c* and a tactile sensation will be not presented in tactile sensation presentation unit 60.

Thus, even when two contact manipulations that are detected on touch panel unit 10 trace mutually identical tracks, if the time intervals of the contacts to touch panel unit 10 that precede tracing these tracks differ from each other, displays of display unit 20 and operations of tactile sensation presentation unit 60 that differ from each other will be determined in input assessment unit 70 based on the conditions relating to the times in which the contact manipulations were performed and the tracks of the contact manipulations on touch panel unit 10.

In addition, when contact manipulation is no longer detected in Step 2 after the passage of a time interval of 0.3 seconds from the detection of contact manipulation in Step 1, or when the area in which the contact manipulation was detected on touch panel unit 10 does not move after the detection of the contact manipulation in Step 1, input assessment unit 70 judges whether the state in which contact manipulation was detected in Step 1 continued for one second or more (Step 11).

If the state in which contact manipulation was detected in Step 1 continues for one second or more, operations will be determined in input assessment unit 70 based on the conditions that have been set in the table shown in FIG. 3 to subject the areas of the image being displayed on display unit 20, in which the contact manipulation was detected on touch panel unit 10, to an enlarged display and to intensify the tactile sensation that is presented in tactile sensation presentation unit 60. This determination is then sent to CPU 90, and under the control of CPU 90, of the image that was displayed on display unit 20, the image that was displayed in the area in which the contact manipulation was detected on touch panel unit 10 is subjected to enlarged display and the tactile sensation that was presented is intensified in tactile sensation presentation unit 60 (Step 12). As one form of intensifying the tactile sensation that can be considered, when tactile sensation presentation unit 60 is made up of, for example, a compact vibrator as described hereinabove, the vibration of the vibrator will be increased to intensify the sensation imparted to finger 3.

Still further, when a state in which the contact manipulation was detected in Step 1 does not continue for one or more seconds, an operation by which a tactile sensation is presented in tactile sensation presentation unit 60 will be determined in input assessment unit 70. This determination is then sent to CPU 90, and under the control of CPU 90, a tactile sensation in accordance with the image that was displayed in the area in which the contact manipulation was detected is presented by tactile sensation presentation unit 60 (Step 13). At this time, the display on display unit 20 may be switched in accordance with the image that was presented in the area in which the contact manipulation was detected in Step 1, or the display may be left as is.

Thus, in the present exemplary embodiment, conditions are set of the display of display unit 20 and the operation of tactile sensation presentation unit 60 regarding contact manipulation of touch panel unit 10, and display on display unit 20 and operation of tactile sensation presentation unit 60 that accord with contact manipulation that was detected on touch panel unit 10 are controlled based on these conditions, whereby the user, by setting conditions for contact manipulations that he or she expects to carry out upon touch panel unit 10, is able to perform operations that correspond to each of the various manipulations that the user performs. For example, when the user traces touch panel unit 10 with a finger, it is possible to judge whether this action is a scrolling manipulation or a manipulation to confirm tactile sensation, thereby enabling operation that is based on this manipulation. Here, the setting in the table of input assessment unit 70 of operations in accordance with any combination of the number, position, time, track, speed of movement for contact manipulations of touch panel unit 10 enables operations that are based on the number, position, time, track, speed of movement, and further, a combination of these factors.

In the present exemplary embodiment, explanation has related to an example that uses only contact manipulations upon touch panel unit 10, but a device may also be used that detects proximate manipulations of a contacting object such as the user's finger, or a device may be used that detects not only contact manipulations but also proximate manipulations based on the distance from the contacting object such as the user's finger.

The information that is displayed on display unit 20 may include, in addition to the above-described images and moving pictures, information that is displayed on, for example, a browser screen or an electronic mail screen that are received by way of communication unit 80.

The display device of the present invention is not limited to portable terminal 1 such as has been described above, and any device that is capable of both displaying information and detecting contact and/or proximate manipulations can be used.

In the present invention, the processing in portable terminal 1, apart from being realized by the above-described dedicated hardware, may also be realized by recording a program for realizing these functions on a recording medium that can be read in portable terminal 1 and then having the program that was recorded on this recording medium read into and executed by portable terminal 1. The recording medium that can be read in portable terminal 1 refers to an IC card, a memory card, a relocatable recording medium such as a floppy disk (registered trademark), a magneto-optical disk, a DVD, or a CD, or to an HDD that is incorporated in portable terminal 1. The program recorded on this recording medium is read into, for example, a control block, and processing that is the same as the processing described hereinabove is carried out under the control of the control block.

Although the invention of the present application has been described with reference to the above-described exemplary embodiment, the invention of the present application is not limited to the above-described exemplary embodiment. The configuration and details of the invention of the present application are open to various modifications within the scope of the invention of the present application that will be clear to one of ordinary skill in the art.

This application claims the benefits of priority based on Japanese Patent Application No. 2012-047144 for which application was submitted on Mar. 2, 2012 and incorporates by citation all of the disclosures of that application.

What is claimed is:

1. A display device comprising:

display means that displays information;

contact/proximity detection means that is provided on said display means and that detects a contact and/or proximate manipulation;

tactile sensation presentation means that presents a tactile sensation by way of said contact/proximity detection means;

input assessment means that, based on conditions that have been set for said contact and/or proximate manipulations, determines display of said display means and operation of said tactile sensation presentation means in accordance with contact and/or proximate manipulation that was detected in said contact/proximity detection means; and control means that, based on the determination in said input assessment means, controls display of said display means and operation of said tactile sensation presentation means, wherein said input assessment means, based on conditions relating to the number, position, time, track, as well as speed of movement or a combination of these factors regarding said contact and/or proximate manipulations, determines display of said display means and operation of said tactile sensation presentation means in accordance with contact and/or proximate manipulation that was detected in said contact/proximity detection means, wherein, even when two manipulations that have been detected in said contact/proximity detection means trace the same track as each other, if the time intervals of contact and/or proximity that precedes tracing said tracks are different, said input assessment means will determine mutually differing display of said display means and operation of said tactile sensation presentation means, wherein said input assessment means determines that only one of an operation in which display by said display means changes and an operation in which a tactile sensation is presented by said tactile sensation presentation means is implemented according to a contact and/or proximate manipulation that was detected in said contact/proximity detection means, and wherein i) if the time interval from the detection of contact and/or proximity manipulation until detection of tracing the track is within the predetermined time, the input assessment means determines an operation in which display by the display means changes, and ii) if the time interval from the detection of contact and/or proximity manipulation until detection of tracing the track is greater than the predetermined time, the input assessment means determines an operation in which a tactile sensation is presented by the tactile sensation presentation means is implemented.

* * * * *